(12) United States Patent
Sadri et al.

(10) Patent No.: US 9,043,434 B1
(45) Date of Patent: May 26, 2015

(54) ALTERNATE PAGE DETERMINATION FOR A REQUESTED TARGET PAGE

(75) Inventors: Pasha Sadri, Menlo Park, CA (US); Jonathan J. Trevor, Menlo Park, CA (US)

(73) Assignee: Polyvore, Inc., Mountain View, CA (US)

( * ) Notice: Subject to any disclaimer, the term of this patent is extended or adjusted under 35 U.S.C. 154(b) by 134 days.

(21) Appl. No.: 13/230,681

(22) Filed: Sep. 12, 2011

(51) Int. Cl.
*G06F 15/16* (2006.01)
*H04L 12/28* (2006.01)

(52) U.S. Cl.
CPC .................... *H04L 12/2825* (2013.01)

(58) Field of Classification Search
USPC .................... 709/203, 217, 226; 705/26.8
See application file for complete search history.

(56) References Cited

U.S. PATENT DOCUMENTS

| | | | |
|---|---|---|---|
| 5,884,033 A | 3/1999 | Duvall et al. | |
| 5,987,606 A | 11/1999 | Cirasole et al. | |
| 6,449,765 B1 | 9/2002 | Ballard | |
| 7,110,399 B2 | 9/2006 | Banerjee et al. | |
| 7,194,464 B2 | 3/2007 | Kester et al. | |
| 7,289,519 B1 | 10/2007 | Liskov | |
| 7,383,282 B2 | 6/2008 | Whitehead et al. | |
| 7,483,982 B2 | 1/2009 | Hegli et al. | |
| 7,725,458 B2 | 5/2010 | Urakawa et al. | |
| 7,761,500 B1 * | 7/2010 | Eckert et al. ........... | 709/203 |
| 7,818,312 B2 | 10/2010 | Broder et al. | |
| 7,958,258 B2 | 6/2011 | Yeung et al. | |
| 8,370,939 B2 | 2/2013 | Zaitsev et al. | |
| 2002/0010757 A1 | 1/2002 | Granik et al. | |
| 2002/0152237 A1 | 10/2002 | Cohen et al. | |
| 2002/0188520 A1 * | 12/2002 | Willner et al. ........... | 705/26 |
| 2004/0107296 A1 * | 6/2004 | Donker et al. ........... | 709/245 |
| 2006/0004716 A1 | 1/2006 | Hurst-Hiller et al. | |
| 2007/0071200 A1 | 3/2007 | Brouwer | |
| 2008/0040225 A1 | 2/2008 | Roker | |
| 2010/0145829 A1 * | 6/2010 | Bloomfield ........... | 705/27 |
| 2011/0010336 A1 | 1/2011 | Johnson et al. | |
| 2012/0259833 A1 | 10/2012 | Paduroiu | |

FOREIGN PATENT DOCUMENTS

WO 0133371 5/2001

* cited by examiner

*Primary Examiner* — El Hadji Sall
(74) *Attorney, Agent, or Firm* — Meyertons, Hood, Kivlin, Kowert & Goetzel, P.C.

(57) ABSTRACT

Methods and structures are disclosed that allow a user navigation action (e.g., clicking a link in a web browser) to be intercepted for a determination of whether to provide the user an alternate page instead of a requested target page. A user may be redirected to an alternate page based on various criteria, including data related to content of the target page, whether the target page is unavailable, etc. In some embodiments, alternate page determination is performed by a computer system of a website different from a website of the target page. Thus, presenting an alternate page to a user may be based on a target page featuring an out-of-stock product, or one that is currently unavailable with certain features. The alternate page may include more useful content, and may include a current link to purchase the product, a link to purchase a similar product, or other features.

12 Claims, 10 Drawing Sheets

ALTERNATE PAGE DETERMINATION FOR A REQUESTED TARGET PAGE

BACKGROUND

1. Technical Field

The present disclosure relates generally to content available over a wide-area network, and more particularly, to methods, techniques, and structures for determining whether to provide an alternate web page (or alternate content) based on data relating to content of a target page.

2. Description of the Related Art

The Internet includes a vast number of websites, each of which may include a variety of web pages having different content. These websites, pages, and content are constantly changing. Accordingly, over time, a particular page may no longer be available, such as when a domain name or link path is changed (creating a broken link), when a company that owns a website goes out of business and the domain expires, etc. Still further, as time passes, the content of a particular page may lose relevancy or become stale. For example, consider a web page that describes a particular product offered for sale by a merchant. If a user attempts to access that page months or years later, even if the page still exists, that particular product may no longer be available, either via the web page or from the merchant generally. As another example, a web page might offer a certain product (e.g., a shoe) for sale in a variety of sizes. However, the web page might not have that product available in the right size for a particular user (e.g., a user who needs a size 13EE shoe). Thus, while some users could find the web page helpful, that particular user might find the web page useless. A user that selects a link to useless content or a link that is broken may thus end up viewing a page that is not helpful (such as a page with no option to "buy," or a page without the right-sized product in stock), or the user may simply receive an error message (such as a "page not found" error). Such a result may cause a bad user experience, as well as loss of traffic, sales, and/or revenue for a website or an affiliate associated with a transaction.

SUMMARY

Techniques and structures are described that allow the interception of a user selection of a link going to an e-commerce or other website. Interception of a link may allow a user to be presented with an alternate page if the target page is no longer available. Alternate pages and/or content may also be provided if a product is out of stock on the target page, or if other rules or preferences indicate that an alternate page should be provided rather than the initial target. Such an alternate page may be provided based on an intelligent, dynamic decision-making process, rather than a simple "static" redirection (for example, being directed to a top-level domain front page upon encountering a page not found error).

Accordingly, in one embodiment, a redirection system may intercept a user's navigation action, determine whether to let the navigation proceed, and optionally change a result of the navigation by redirecting the user to an alternate target page or by the redirection system generating and serving its own alternate page. An alternate page may have the same or similar content as a target page. For example, a user attempting to purchase a particular product may be redirected to another page that also sells the particular product, or a similar one. A user attempting to reach a news story that has expired may be redirected to the same news story as published by a different website, or may be redirected to a different news story on the basis of keywords, topics, or other similar content. The techniques disclosed herein may also be used in other environments and contexts.

By intercepting a user's navigation action and optionally redirecting it, a browsing or shopping experience for a user can thus be improved. As a result of the methods and techniques of various embodiments described in this application, commerce may be more easily transacted, and information can be better shared. The teachings of this disclosure and the appended claims, however, are not limited by the features and embodiments discussed in this summary.

In the following description, numerous specific details are set forth to provide a thorough understanding of the methods, structures, and mechanisms presented herein. However, one having ordinary skill in the art should recognize that the various embodiments may be practiced without these specific details. In some instances, well-known structures, components, signals, systems, devices, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

DETAILED DESCRIPTION

Figure 1A:
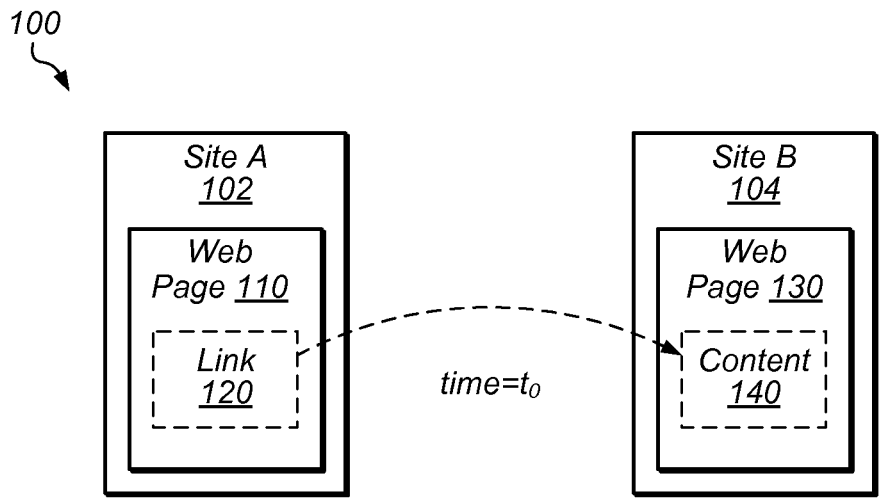
FIG. 1A is a block diagram illustrating a logical view of a link in a first web page that points to content of a second web page.

Turning now to FIG. 1A, a block diagram 100 is shown illustrating a logical view of a link included in a web page of a first website, where the link points to content of a second web page on a second website. This link may be functional at a first time $t_0$. (Note in that generally, as used herein, the term "website" has its ordinary and accepted meaning in the art, and includes one or more computer systems logically and/or physically connected that are configured to implement server-side functionality for a web site.)

In FIG. 1A, Site A (102) and Site B (104) may be hosted on one or more respective web servers, and respectively include web pages 110 and 130 as shown. Web page 110 may be an HTML page viewable by a web browser, and as shown in FIG. 1A, includes a link 120. In the embodiment of FIG. 1A, link 120 is selectable by a user to navigate to another web page 130, which includes some particular content 140. At a first time $t_0$, when a user is viewing web page 110 and clicks (or otherwise selects) link 120, the user's browser will navigate to web page 130 and cause content 140 to be displayed. (Note that in some embodiments, link 120 may instead point to a web page on the same web site as page 110, i.e., another page on Site A.)

Content 140 may include information describing offers to sell one or more particular products. For example, content 140 may describe a pair of women's high-heeled brown leather boots, and also include a link to begin a purchase process. Thus, a user that successfully follows link 120 may buy one or more products relating to content 140 of web page 130. A referring party may receive compensation from a seller when a user is referred to web page 130 and successfully makes a purchase related to content 140. (For example, link 120 may include a referrer or affiliate ID, via which a seller may be able to determine the identity of a referring party. The seller may then compensate the referrer for bringing her a customer.)

Figure 1B:
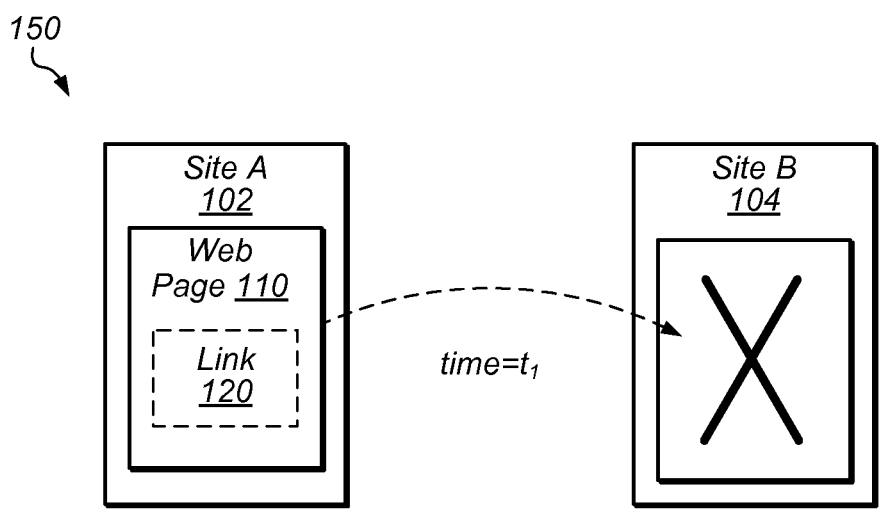
FIG. 1B is a block diagram illustrating a logical view similar to that of FIG. 1A, but in this view, content of the second web page is unavailable.

Turning to FIG. 1B, a block diagram 150 is shown that is similar to that of FIG. 1A. However, FIG. 1B illustrates a logical view of FIG. 1A at a later time $t_1$, when link 120 points to unavailable content on Site B. The previously accessible content 140 may be unavailable for any number of reasons. For example, web page 130 may have been deleted or renamed. Web page 130 may have been edited so that content 140 no longer exists on that page. (For example, if content 140 included information describing an offer to sell a certain product, and that product were later sold-out, discontinued, or otherwise unavailable, page 130 might be changed.) Accordingly, a user selecting link 120 at time $t_1$ might receive an error page, or might receive a page without an offer to purchase the product (or a similar product). Note that in some embodiments link 120 may point to a page on a same website (Site A) rather than a different website (Site B).

In FIG. 1B, a user following link 120 may thus be denied the ability to purchase a product, and a seller associated with Site B may be denied the chance to make a sale. Further, a referring party may also be denied the chance to receive compensation for assisting the user to make a purchase. Accordingly, it would be desirable for a user that selects link 120 to be provided with an alternate web page instead of receiving an error page or a page with undesirable content (such as content that does not include information describing an offer to buy women's high-heeled brown leather boots, or something similar).

Figure 2A:
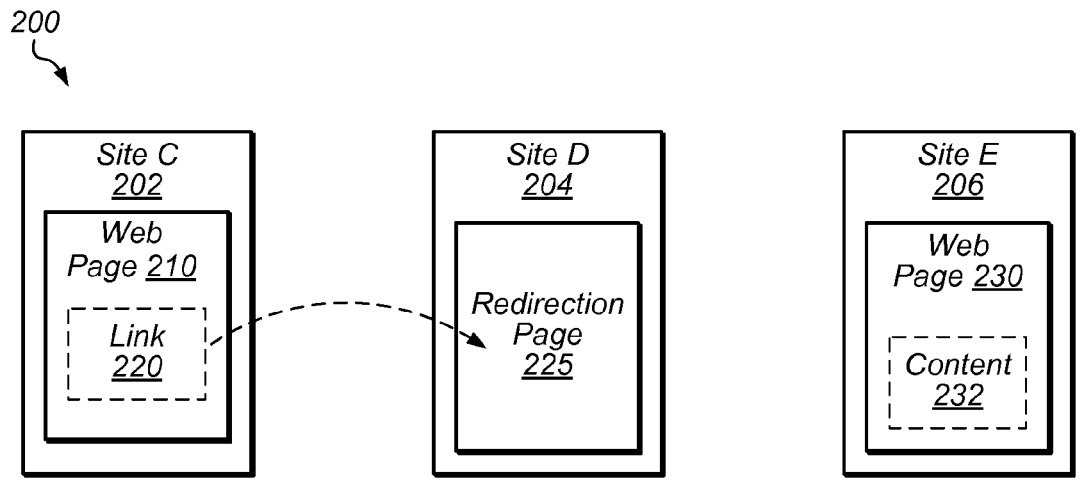
FIG. 2A is a block diagram illustrating a logical view of first, second, and third websites. A link in the first website points to the second website. The second website is configured to redirect this link to content of the third website.

Turning now to FIG. 2A, a block diagram 200 illustrating a logical view of first, second, and third websites is shown. In this diagram, a link in the first website points to the second website, and the second website is configured to redirect this link to content of the third website. Redirection techniques described relative to FIG. 2A are usable in some embodiments as a solution to the problem of broken or stale links.

Site C (202), Site D (204), and Site E (206) may be hosted on one or more respective web servers, and may include various web pages. As shown in FIG. 2A, web page 210 includes a link 220 that points to Site D. In this embodiment, when a user selects link 220 via a web browser, a redirection page 225 at Site D will be activated. Redirection page 225 will cause Site D, in the embodiment of FIG. 2A, to perform a redirection of link 220 to page 230 on Site E. Such redirection may be accomplished in a variety of manners, as will be recognized by a person having skill in the art. (See, for example, HTTP redirection as described in the HTTP/1.1 Specification, located at http://www.w3.org/Protocols/rfc2616/rfc2616-sec10.html#sec10.3.) Redirection can be accomplished using HTML tags (such as the "meta" tag with a value of "http-equiv+'Refresh'"), or through the use of scripting code (just as JavaScript). Redirection logic (e.g., redirection code) can stored on a page other than page 225 in one embodiment, and can redirection logic be activated in various embodiments by server side includes, Active Server Pages (ASPs), JavaServer Pages (JSPs), or other techniques. The manner in which redirection is performed is not limited to the examples described above, however, and in some embodiments, redirection is accomplished by techniques other than a redirection page such as page 225.

In some embodiments, a "web service" may be implemented to run on a website such as Site D. Such a web service may, as further discussed below, determine an alternate page and/or provide that alternate page to a user. However, a web service may not require a user to "land on" or navigate to an actual HTML page or use HTTP redirection in various embodiments. For example, a browser applet, script program and/or other program running on a user computer system may contact the web service via any techniques known in the art to submit a request as to whether an alternate page should be used instead of (or in addition to) a target page. Accordingly, a website such as Site D will "intercept" a request for a target page in some embodiments, while in other embodiments, a user system may perform "interception" of a request for a target page.

Figure 2B:
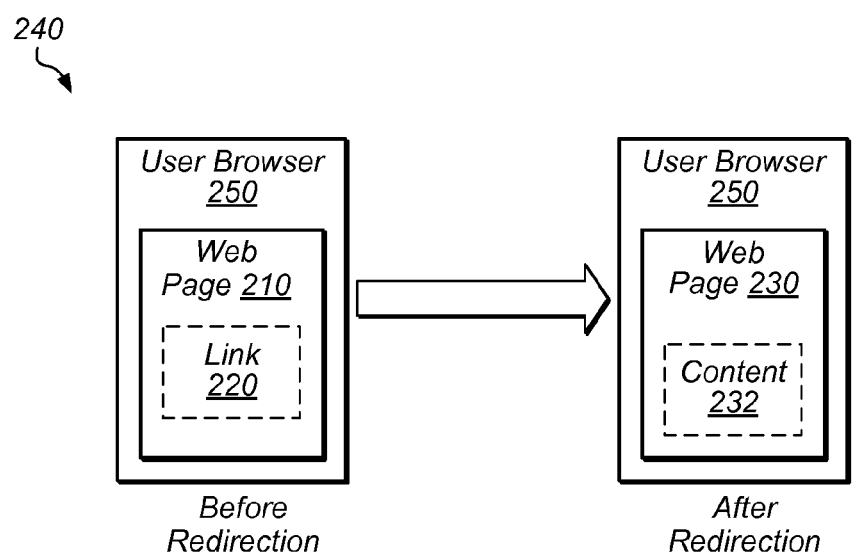
FIG. 2B is a block diagram illustrating a web browser transitioning from a view of the first website of FIG. 2A to a view of the third website of FIG. 2A in response to a selection of the link in the first website.

In FIG. 2A, after Site D receives a request for redirection page 225 in the embodiment of FIG. 2, a user's web browser will receive a page to which the original request has been redirected. Accordingly, in one embodiment, web page 230 will be served in response to a user that has selected link 220. FIG. 2B illustrates a block diagram 240 of a user's perspective, in which a web browser 250 transitions from a view of the first web page 210 to a view of web page 230 (including content 232) in response to a selection of link 220. In the embodiment of FIG. 2B, this transition is seamless from the perspective of the user. In other embodiments, the user may receive a warning indicating that redirection is about to occur (e.g., a message may be displayed telling the user she is being redirected to a different page or different domain), or be asked for permission to allow redirection to occur.

Redirection techniques are not limited to scenarios in which three different websites exist (as depicted in FIG. 2A). For example, in one embodiment, redirection page 225 is hosted by Site C, rather than a different Site D. Thus, in at least one embodiment, redirection can occur without sending information to a separate website or domain. In another embodiment, web page 230 may be may be located on the same site from which the link to be redirected is hosted (Site C, in the embodiment of FIG. 2A). Thus in yet another embodiment, a source web page such as 210, a redirection page such as 225, and a destination (or target) page such as 230 may all be hosted by a single website. Accordingly, many different configurations of source page, redirection page (or other redirection logic), and target page are possible. Further, as noted above, redirection and/or alternate page determinations may be implemented as web services in some embodiments; in such embodiments, all redirection techniques described with respect to a "redirection page" may be implemented through client-side logic and/or through the web service.

Note that as used herein, the term domain has its ordinary and accepted meaning in the art, and includes "top level domains." The term "top-level domain" also has its ordinary and accepted meaning in the art, and includes one or more computer systems configured to implement server-side functionality for a top-level Internet domain (such as a domain ending in .com, .org, .net, etc.) The term "top level domain" does not include second-level internet domains—for example, as used herein, both "server01.megastore.com" and "server22.megastore.com" would be considered to be part of the same "megastore" top level domain.

Figure 3A:
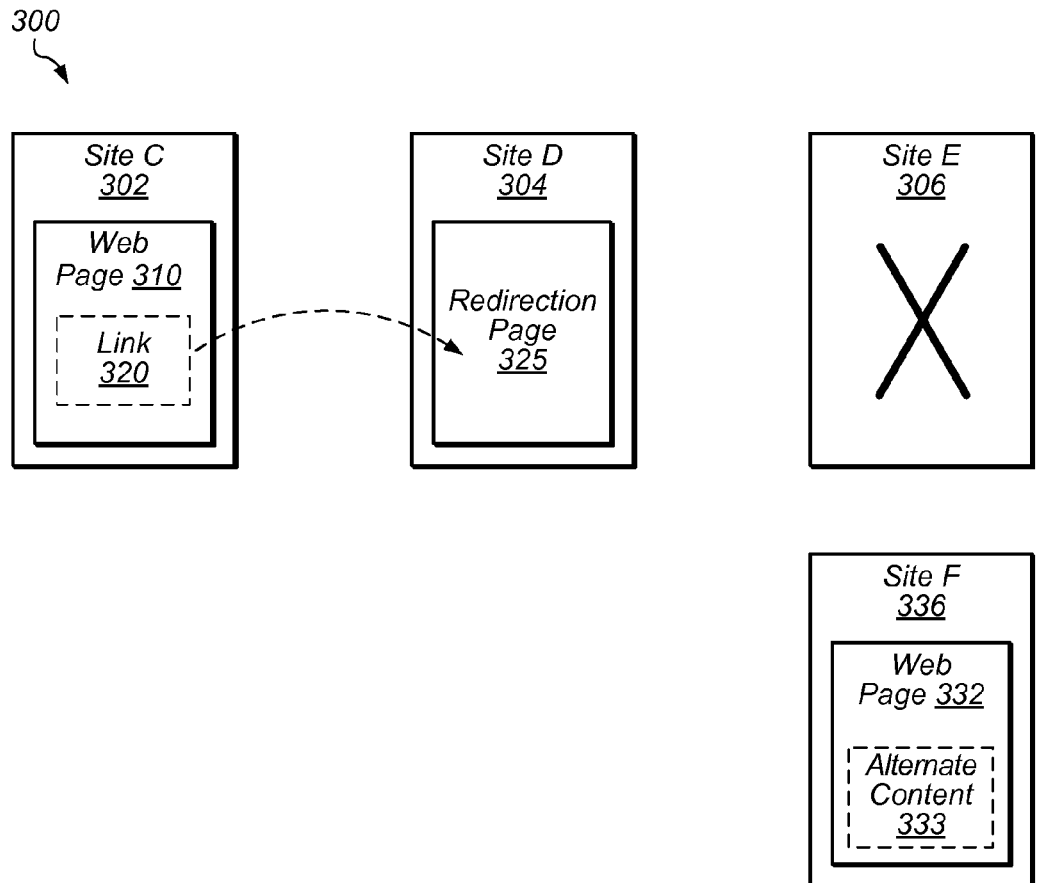
FIG. 3A is a block diagram illustrating a logical view of first, second, third, and fourth websites. A link in the first website points to the second website. The second website is configured to redirect this link to content of the fourth website based on a determination that content of the third website is unavailable.

Turning now to FIG. 3A, a block diagram 300 illustrating a logical view of first, second, third, and fourth websites is shown. As shown, a link 320 in the first website 302 points to the second website 304. The second website is configured to redirect this link to content of the fourth website 336 based on a determination that content of the third website 306 is unavailable.

Note that generally, the phrase "based on" is used herein to describe or indicate that one or more factors affect a determination. This term does not foreclose additional factors that may affect the determination. That is, a determination may be solely based on those factors or based, at least in part, on those factors. Consider the phrase "determining A based on B." While, in this example, B is a factor that affects the determination of A, such a phrase does not foreclose the determination of A from also being based on C. In other instances, however, A may be determined based solely on B.

In the embodiment of FIG. 3A, Site C (302), Site D (304), Site E (306), and Site F (336) are hosted on one or more respective web servers, and may include various web pages. As shown in FIG. 3A, web page 310 includes a link 320 that is pointed at Site D. Specifically, link 320 may include a URI pointing to redirection page 325. Thus in at least one embodiment, when a user selects link 320, an HTTP request will be sent to Site D from the user's web browser. This HTTP request will specify redirection page 325, and may be received and handled by a web server running on Site D. As explained below, this HTTP request may also include information indicating a "target page" other than page 325. (In other embodiments, however, may receive information indicating a request for a target page in a manner other than a user requesting a URI for a redirection page via HTTP.) The format of user requests is discussed further below relative to FIG. 3C.

In the embodiment of FIG. 3A, when a user navigates to redirection page 325 (e.g., makes an HTTP request for page 325), Site D is configured to provide an HTTP response back to the user's web browser. This HTTP response may indicate that the user should be redirected to a particular page—for example, to a target page on Site E. Site D is also configured, in various embodiments, to make an intelligent determination before providing an HTTP response to the user's HTTP request (for page 325). This determination may be based on various factors in various embodiments, and will determine whether the HTTP response will be formulated so as to redirect the user's web browser to the target page (e.g. on Site E), or to an alternate page. In the embodiment of FIG. 3A, for example, the user makes an HTTP request to Site D. This request includes information indicating a desired target page on Site E (not shown). Site D then makes a determination that the target page of Site E is unavailable. Site D then makes another determination, in this embodiment, to redirect the user to an alternate page 332 on site F. Accordingly, in the embodiment of FIG. 3A, when the user selects link 320, an HTTP request is made for redirection page 325. Site D answers this HTTP request and sends an HTTP response, which indicates the user's browser should navigate (be redirected to) an alternate page 332 on a different Site F (336), where alternate content 333 is hosted. Thus, instead of receiving an error that Site E's target page was unavailable, the user is instead redirected to an alternate page in the embodiment of FIG. 3A.

In response to an HTTP page request from a user, Site D may be configured to provide various information (which may be in the form of an HTTP response) in different embodiments. Site D may serve up a redirect to its own site, for example, instead of a redirect to another site. Site D may also choose to serve up a page (rather than a plain redirect response) in response to a user request. For example, rather than providing a response to a user that will cause the user's browser to silently and/or automatically cause the browser to navigate to a different page, Site D might serve a page that explains to the user that the target page was not found, and that also provides one or more alternate links to other pages that the user may be able to follow. (Note, of course, that a "page not found" error is not the only criterion that may be used in determining whether to provide a target page or an alternate page.)

The embodiment of FIG. 3A is only one of a number of contemplated embodiments in which a determination is made as to whether to provide an alternate page in response to a target page request. As in FIG. 2A, different configurations of websites, page locations, and/or redirection logic are contemplated. In one embodiment, redirection page 325 is hosted by Site C, rather than a different Site D (and thus, in at least one embodiment, redirection can occur without sending information to a separate website and/or domain). In another embodiment, web page 332 may be may be located on the same site from which the link to be redirected is hosted (Site C, in the embodiment of FIG. 3A) Likewise, Site E is not present in an embodiment in which the original target page on Site E (not depicted) is on Site C instead. Accordingly, in one embodiment, a source web page such as 310, an original destination (or target) page, and a redirected target page such as 332 may all be specified as belonging to a single website and/or domain. In yet another embodiment, a single website and/or domain hosts redirection page 325 in addition to source page 310, alternate page 332, and is also specified as a location for the original target web page (e.g., the target web page has a URI identifying it as belonging to that site and/or domain, even if the target web page does not actually exist or is not reachable).

Figure 3B:
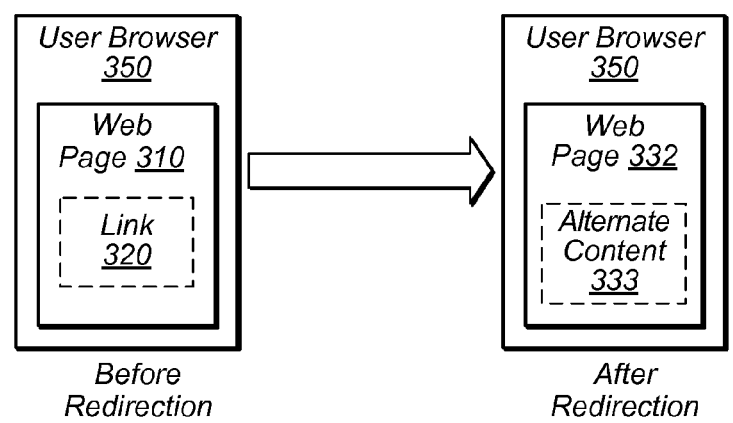
FIG. 3B is a block diagram illustrating a user web browser transitioning from a view of the first website of FIG. 3A to a view of the fourth website of FIG. 3A in response to a selection of the link in the first website.

FIG. 3B illustrates a block diagram showing a transition of a view of a user web browser 350 before and after redirection occurs. As shown, the user's web browser transitions from page 310 to page 332 and its alternate content 333, similar to the manner of FIG. 2B.

Figure 3C:
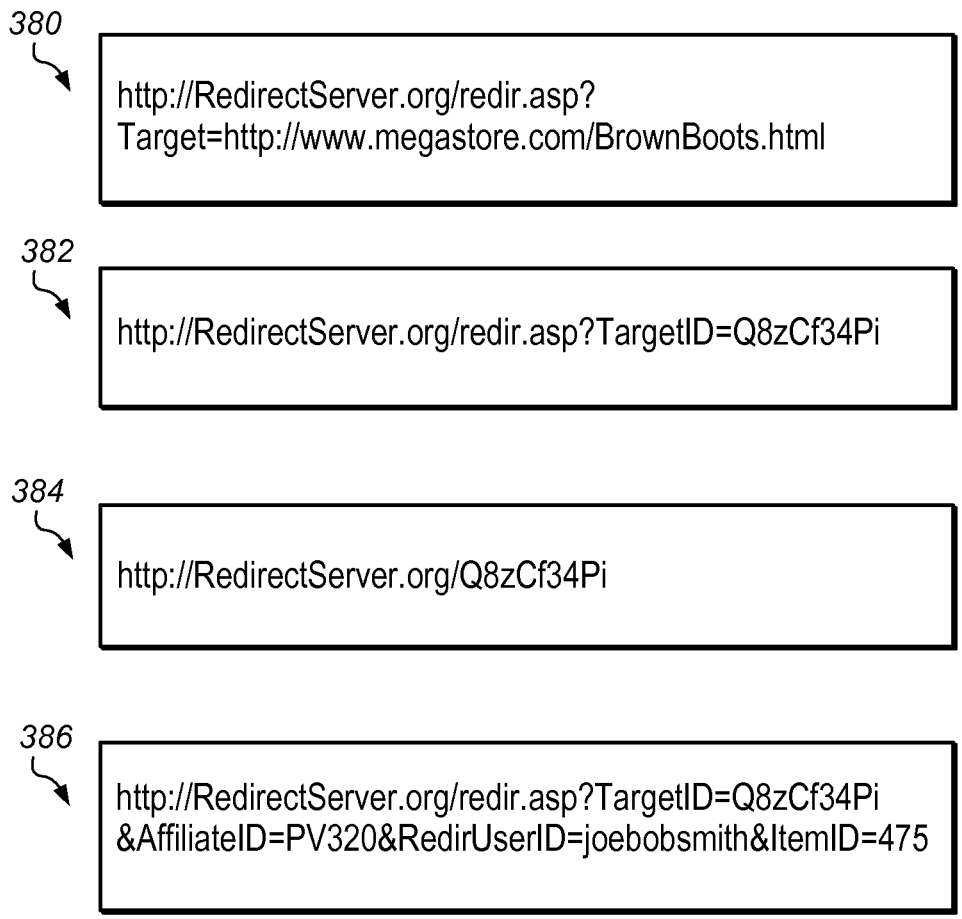
FIG. 3C is an illustration of a variety of formats for links that are redirectable.

Turning now to FIG. 3C, a figure illustrating a variety of formats for redirectable links is shown. Links 380, 382, 384, and 386 are in formats that are usable, in various embodiments, by redirection logic to determine a destination "target page" associated with the link. For example, links 380 and 382 both use a request parameter as part of their URI. In link 380, a parameter called "Target" is passed to the site RedirectServer.org with a value of http://www.megastore.com/BrownBoots.html. Accordingly, RedirectServer.org will know from this parameter what the desired target URI for link 380 is. In link 382, a TargetID parameter is used. Instead of a complete URI, this may be an ID value that includes alphanumeric or other characters. For example, this ID value might be derived from a hash performed on the URI of the target page. A server that receives this parameter might look up the ID value in a database to determine the full target page URI. In link 384, identifying information for the target page is contained in the URI itself—for example, an ID value such as the TargetID parameter from link 382 may form a sequence of characters in the URI that can be parsed by a computer system configured to perform redirection ("redirection system," or "RDS"). Accordingly, in various embodiments, a link such as link 320 in FIG. 3A may take the form of any one of links 380, 382, 384, or 386 and may be usable by a website such as Site D (304) to determine a target page.

Figure 3D:
FIG. 3D is an illustration of an example of a target URI (link) after a redirection has occurred.

Target pages or target URIs may also have additional information. For example, a redirection system may be configured to determine the target page with the inclusion of one or more additional parameters attached. Link 386 shows one form of a URI that could be received by a redirection system. This URI includes several parameters, respectively labeled TargetID, AffiliateID, RedirUserID, and ItemID. The RDS may be configured according to one or more rules to use some or all of these parameters to formulate the target page URI. In the embodiment of FIG. 3D, link 387 in shows an example of a target URI based on link 386 in which an AffiliateID value has been used, along with a value for the parameter ItemID. The parameter RedirUserID from link 386 has been dropped. In this example, the AffiliateID may indicate the identity of a referring party who should be compensated for a successful sale, and ItemID may be another value indicates to the server for megastore.com which particular brown boots a user may be interested in. The RedirUserID value, meanwhile, may only be used internally by the RDS to indicate the identity of a user making a request for the target page. By using a user identity, the RDS may be able to update and maintain information that is specific to a particular user, such as preferences, historical, and/or heuristic information related to shopping behavior.

Other embodiments may use different techniques to enable a server to determine a target page URI, and the present disclosure is not limited to the examples above. A redirection system may receive information from a source computing device or website in a variety of manners, and not merely as parameters to a URI. The redirection system may likewise cause information to be passed to a user computing device or to a server hosting a target page in a manner other than URI parameters in various embodiments.

Figure 4:
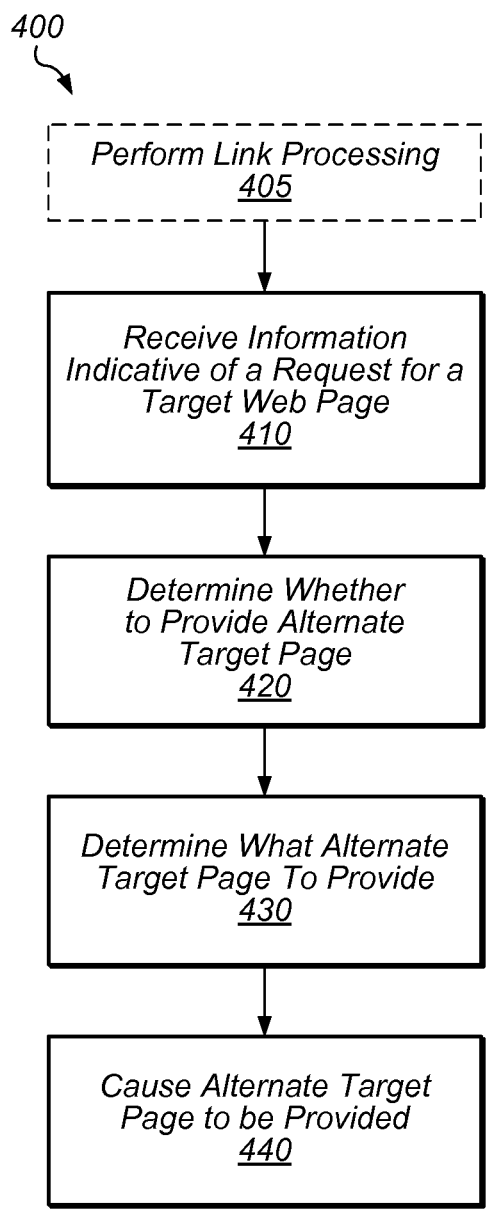
FIG. 4 is a flow diagram illustrating one embodiment of a method in which a link may be redirected and an alternate page may be provided.

Turning now to FIG. 4, a flow diagram 400 is shown illustrating one embodiment of a method in which a link may be redirected and an alternate page may be provided. In various embodiments of the method described below, one or more of the elements described may be performed concurrently, in a different order than shown, or may be omitted entirely. Other additional elements may also be performed as desired. All or a portion of the steps of method 400 may be performed by a redirection system and/or a computer system as described below with respect to FIG. 9, though in one embodiment, step 405 is performed by a different computer system or computing device than the other steps.

In step 405, link processing may be performed in order to create redirectable links. Link processing will be described in greater detail below with respect to FIG. 5B, but may refer to the process of taking a target page URI and transforming it into a format parseable by a redirection system.

In step 410, information indicative of a request for a target web page is received. In one embodiment, this information may be in the form of a URI such as 380, 382, 384, or 386. Thus, in one embodiment, a user that types a URI such as 380 into a web browser may be making an HTTP request for that URI; within the URI may be an indication of a different target page. Thus, an HTTP request for a redirectable link (URL such as 380, etc.) may comprise information indicative of a user request for the target page, and may be received by a web server running on a redirection system. In other embodiments, however, information indicative of a request for a target web page may be received in other manners (e.g., any format in which a redirection system may be contacted that indicates a desired target page that may be redirected). In some embodiments, for example, a web service running on a redirection system or other computer system may receive information indicating a request for a target web page via communication ports other than HTTP port 80 and HTTPS port 443. Accordingly, in some embodiments, information indicating a request for a target web page may be communicated to the web service via one or more standard communication protocols or via one or more custom communication protocols.

In one embodiment, the information indicative of a request for a target web page is received by a redirection system that belongs to a domain other than that of a domain to which the target web page belongs. For example, a redirection system may belong to a domain such as POLYVORE.COM, while the target web page may belong to a domain such as ABERCROMBIE.COM. In another embodiment, information indicative of a request for a target web page is received by a computing device, where the target web page is part of a website to which the computing device is external. (A computing device or computer system may be considered "external" or as "not belonging" to a website if the device is not owned by an owner of the website, or if it is not tasked with performing business functions of the website. A computing device that is only affiliated with a website to the extent that the computing device is used to perform ordinary consumer purchases on the website is not "external" to that website as that term is used herein.) In another embodiment, a computer system is configured to receive information indicative of a request for a target web page located on a website implemented by a set of one or more computer systems that does not include the computer system.

In step 420, a determination is made as to whether to provide an alternate web page. In one embodiment, this determination is performed external to a target website that hosts a target page. This determination may also be made, in various embodiments, in response to a user request for the target web page. In one embodiment, determining whether to provide an alternate web page is based on a result of a fetch of data related to content of the target web page. The fetch of this data is performed by a redirection system in some embodiments, while in other embodiments the fetch of data may be performed by another computing device or computer system. The data related to the content of the target web page, and the manner in which it is fetched, varies in different embodiments. In one embodiment, a fetch of data related to content of a target web page occurs prior to a computer system receiving information indicative of a request for the target web page, while in another embodiment, a fetch of data related to content of a target web page occurs subsequent to (or in response to) a computer system receiving information indicative of a request for the target web page. Accordingly, in one embodiment, determining whether to provide an alternate web page may be performed prior to a target website receiving an indication of a request for a target web page (i.e., the target website may be unaware of the request for the target web page).

In step 430, one or more particular alternate target pages are determined. In some embodiments, this step occurs in response or subsequent to a decision to provide an alternate page. In other embodiments, this step may occur prior to the decision to provide an alternate page. The same (or similar) metrics may thus be used, in one or more embodiments, to pre-compute one or more alternate pages for a given target page. These metrics may also be the same (or similar) to metrics used to determine the threshold question of whether an alternate page should be provided. More detail on how an alternate page may be determined is provided below with respect to FIG. 6.

In one embodiment, a computer system computer may cause a web browser of a user making a request for a target web page to load an alternate web page in response to a request for the target page. (Causing the web browser to load the alternate page can be accomplished through a variety of techniques, many of which include providing a URI for the alternate page to the user's system.)

In step 440, a redirection system (or other computer system or computing device) causes the alternate page to be provided. In one embodiment, step 440 comprises providing an alternate page URI to a user's web browser, which may then load the alternate page so that the user can view it. Such a URI may be provided in accordance with HTTP redirection techniques in some embodiments. In one embodiment, causing the alternate page to be provided may include causing a user's computer system to directly contact a website hosting the alternate page (e.g., by providing a URI for the alternate page). In another embodiment, step 440 includes causing the alternate page to be provided via the redirection system itself contacting the website directly (e.g., serving a page directly in response to the user's request for the redirection page). In some embodiments, the RDS may even act as a "go-between" for the user and the alternate page website, by serving a custom page that funnels some or all of the content of the alternate page to the user's computer system.

Thus, in some embodiments, there are two ways in which an alternative target page can be provided. First, a redirect or a link to a different page (different page on the same target domain, or another page elsewhere on the internet) can be provided to the user computing device. For example, if a user request indicated a request for a target page on MACYS.com at which CHANEL perfume is sold, a redirect might be served to the URI BLOOMINGDALES.com/chanelperfume (where the product was in stock). The second way to provide an alternative target page, in some embodiments, is to simply generate a page based on the information indicating a request for a target page. This generation can happen in the normal way a web site creates a page dynamically, and may use data either locally available or remotely fetched. Such a generated page may look nothing like the original target page, or may very closely resemble it with augmented information. Generated alternative pages or portions thereof may also be pre-determined prior to receiving a user request in some embodiments.

Further, note that in at least one embodiment, links to a page of a first website are coded such that they will always point to a redirection page (e.g., a URI that resolves to the Internet address of a redirection system). For example, a retailer such as MACYS.com might create a promotional page for all brown boots sold by MACYS. The URI of the promotional page may be provided to other parties beyond the direct control of MACYS (e.g., social media sites such as FACEBOOK.com, or deal sites such as SLICKDEALS.com). While the promotion is active and/or while goods are still in stock, a user that clicks a link to the promotional page at MACYS.com may simply be served that page. However, at a later time, a redirection system running on the MACYS.com domain may determine that the promotion has ended (or that goods are out of stock in the user's size, etc.) In this case, the RDS running on MACYS.com may serve an alternate page instead of the original target page (the promotional page). Accordingly, in various embodiments, the target page itself may also serve as a redirection page (and optionally redirect whenever it is determined that it would not be desirable to serve the original target page).

In some embodiments, a computer system (such as an RDS) may be configured to determine whether to provide an alternate web page based on redirection criteria other than an unavailability of a target web page. As used herein, the term "unavailability of a page" refers to a determination that a page is actually unavailable (e.g., one or more computer systems or computing devices such as a redirection system or user computing device cannot successfully retrieve the page from a site hosting the page). For example, if a user web browser makes an HTTP request for a particular target page, and a web server receiving that request determines that particular target page is not found (e.g., does not exist on the server), then that particular target page is said to be unavailable. Thus, a server that redirects to an "error" page, or to a top-level domain (front)

page, when confronted with a request that would normally generate a page-not-found error may be said to redirect based only on the unavailability of the target page (that is, if and only if the target page is unavailable, a redirect may be performed or a substitute page may be provided). However, in embodiments contemplated herein, redirection criteria other than the unavailability of a target page are used to determine whether to provide an alternate page.

Figure 6A:
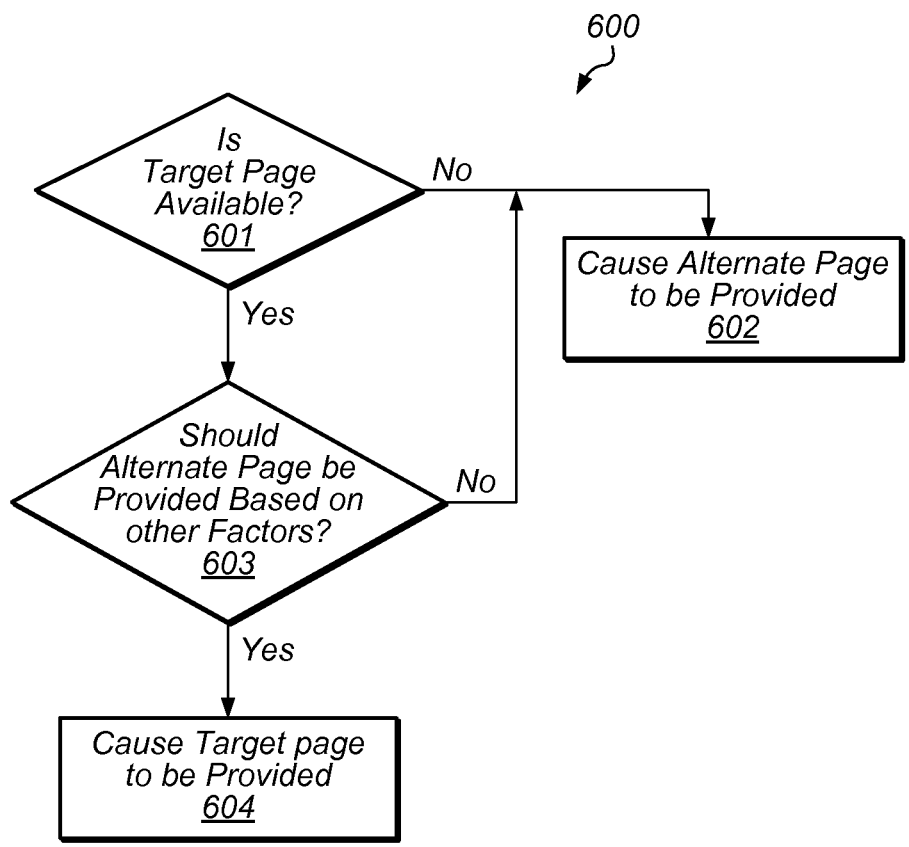
FIG. 6A is a flowchart of one embodiment of a method used to determine whether an alternate page or an original target page should be provided.

Such redirection criteria may include one or more of any of the factors used in the determination steps described in FIGS. 6A and/or 6B. (Note that in one embodiment, the term "redirection criteria" may refer only to a single criterion, while in other embodiments, that term may refer to multiple criterions or factors) In particular, in one embodiment, such redirection criteria include an indication that a product previously indicated as available for purchase via the target web page is not currently available for purchase via the target web page. In another embodiment, the redirection criteria include data related to a user making the request for a target web page. In yet another embodiment, the redirection criteria may include an indication of an age of the target web page. Such an age may be the age since the target web page was created, or an age since the redirection system (or another system) was able to first access the target page. The age of the target web page, in one embodiment, may also refer to an amount of time since the page was last updated (e.g., more than 6 months, etc). The indication of the age of the target web page may be expressed as an exact length of time, or may be expressed in relative terms (e.g., less than a day, less than a week, greater than a month, etc.)

Figure 5A:
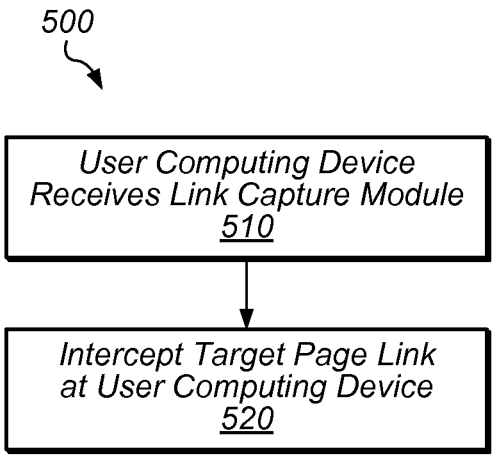
FIG. 5A is a flow diagram illustrating one embodiment of a method in which target page links are intercepted.

Turning now to FIG. 5A, a flow diagram 500 of one embodiment of a method in which target page links are intercepted is shown. This method may, in various embodiments, allow for substitution of a link to a redirection system in place of a simply URI pointing to a target page. In various embodiments of the method described below, one or more of the elements described may be performed concurrently, in a different order than shown, or may be omitted entirely. Other additional elements may also be performed as desired. All or a portion of steps of method 500 may be performed by a computer system as described below with respect to FIG. 9, which may be a computer device or computer system owned or operated by a prospective purchase (or user).

In step 510, a computing device receives a link capture module. A link capture module may be any executable instructions allowing interception of a link as in step 520. In one embodiment, the link capture module includes one or more JavaScript functions that are downloaded to a user computing device, and that are executable by a browser of the computing device. Generally, as used herein, the term module may include and refer to any number of libraries, source files, executables, GUIs, script code, batch files, configuration settings and/or configuration files, as well as other files and/or computer program related objects. Such a code modules may include, be interpreted from, and/or be compiled from one or more different computer-related programming languages, such as C, C++, Java, VHDL, etc. In some embodiments, all or a portion of a code module may be part of an operating system or other software (e.g., drivers, data format translators, etc.) In one embodiments, all or a portion of a code module may be part of a web browser. Thus, in one embodiment, the link capture module is a browser applet. Also note that in various embodiments, all or a portion of one module may be combined into all or a portion of another module, and vice versa (i.e., code may be logically or functionally linked).

In step 520, a target page link is intercepted at a user computing device. In one embodiment, step 520 includes JavaScript code intercepting a user's click (or other selection) of a target page to which the user wishes to navigate. For example, a JavaScript "onclick" routine may be employed in order to capture a user's click of a URI that indicates a request for a target page. Various other scripting techniques and/or web programming techniques may be used to allow a programmatic routine to be entered prior to a browser directly navigating to a target page. Intercepting a click (or other link selection) may be helpful in various embodiments, as it may allow ordinary target URIs to be converted into redirectable URIs that can be sent to a redirection system (e.g., a target link of "http://www.megastore.com/page1.html?itemID=Socks" might be turned into "http://RedirectServer.org/Z3r2jxp" or another URI of a form similar to links 380-386).

Figure 5B:
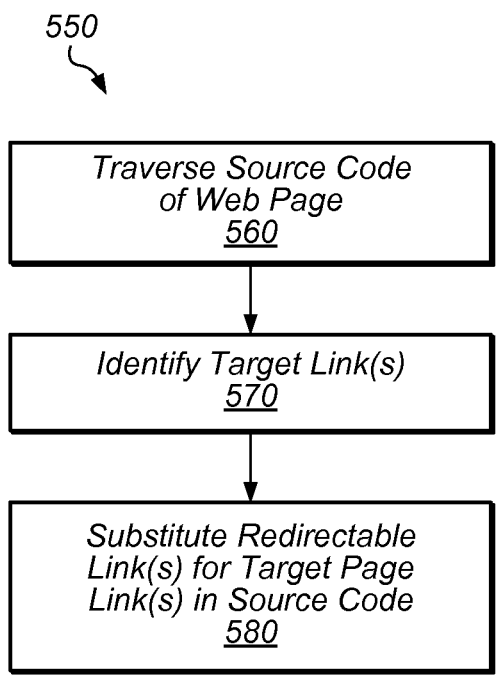
FIG. 5B is a flowchart of one embodiment of a method in which redirectable links are substituted for target page links.

Turning now to FIG. 5B, a flowchart 550 of one embodiment of a method in which redirectable links are substituted for target page links is shown. As used herein, the term "redirectable link" refers to a URI that, when received by a redirection system, can be parsed or decoded to determine a URI of a target page. For example, URIs 380, 382, 384, and 386 are all redirectable links in various embodiments.

Executable code in the form of one or more modules can be used to convert an ordinary (or "plain") target link into a redirectable link. Such conversion may depend on outside factors, such as the location of a redirection system or service to which the redirectable link will point. For example, if one or more web servers for the site Polyvore.com have a redirection service available at the URI "https://polyvore.com/forward.jsp", then a target link of "http://www.shop.com/stuff.html" may be converted to a redirectable link of "https://polyvore.com/forward.jsp?target=http://www.shop.com/stuff.html". Other forms of redirectable links are of course possible. In another embodiment in which a redirection service is running locally on a given computer system, a redirectable link may include a "localhost" address. Further, in some embodiments, a redirection service may be run over a protocol other than HTTP or HTTPS, and thus may change in format accordingly.

An automated module that can convert "plain" links to target pages may be desirable, particularly when a web page or website has old or outdated links that are not in a redirectable format. For example, a user may maintain a fashion blog in which the user has spent months or years copying in regular links that are (or were) targeted at pages with various products for sale. Manually going through such a backlog of links would be a tedious task.

Accordingly, in step 560, a computing device or computer system that is executing a link conversion module may traverse the source code of a web page. In step 570, the computing device may identify one or more links or URIs to be converted to "redirectable" format. Various rules may be applied in determining what links to change. In one embodiment, a user may be presented with a dialog box and answer "yes" or "no" to the question of whether each link should be put in redirectable format. In another embodiment, all links to sites in a particular "white list" of websites will be automatically converted, and the user may be asked about converting other links. In yet another embodiment, all links are converted automatically (except possibly for links on a different white list, which might include, for example, links to a home domain).

In step 580, one or more redirectable links are substituted for target page links in source code. This step may involve removing a string such as "http://www.shop.com/stuff.html" and replacing it with a string such as "https://polyvore.com/forward.jsp?target=http://www.shop.com/stuff.html". In other embodiments, however, redirectable links can be substituted in a different manner by including scripting code on the web page being traversed and/or elsewhere on the website. For example, JavaScript code similar to that described above with respect to steps 510 and/or 520 might be inserted, such that while the original source code might retain the "plain" target link, a user selection of that plain link will be captured and sent to a redirection system for a determination of whether an alternate page should be provided in lieu of the target page.

Turning now to FIG. 6A, a flowchart 600 is shown of one embodiment of a method used to determine whether an alternate page or an original target page should be provided. In various embodiments of the method described below, one or more of the elements described may be performed concurrently, in a different order than shown, or may be omitted entirely. Other additional elements may also be performed as desired. All or a portion of steps of method 600 may be performed by a computer system as described below with respect to FIG. 9, which may be a redirection system in some embodiments. (Though another computing device or computer system may perform steps of method 600, they are described below relative to the RDS.)

As shown, in step 601, a redirection system determines whether a target page is available. Step 601 thus includes, in one embodiment, performing a query on the target page website to see if the target page is currently in existence. Step 601 may also comprise, in various embodiments, any and all aspects of step 620 as described below with respect to FIG. 6B. If step 601 determines that a target page is unavailable, method 600 proceeds to step 602, in which the RDS causes an alternate page to be provided. Step 602 may comprise, in various embodiments, any and all aspects of steps 623 and/or 625 as described below with respect to FIG. 6B.

If a target page is determined to be available in step 601, method 600 proceeds to step 603, which determines whether an alternate target page should be provided based on other factors. In various embodiments, step 603 may include any and all aspects of steps 630 and/or 640 as described below with respect to FIG. 6B. In response to step 603 determining that no alternate page should be used, step 604 comprises the redirection system causing the target page to be provided (e.g., to a user computing device or computer system) in response to step 603 determining that no alternate page should be used. Step 604 may include, in one or more embodiments, any or all aspects of step 650 as described below with respect to FIG. 6B.

Figure 6B:
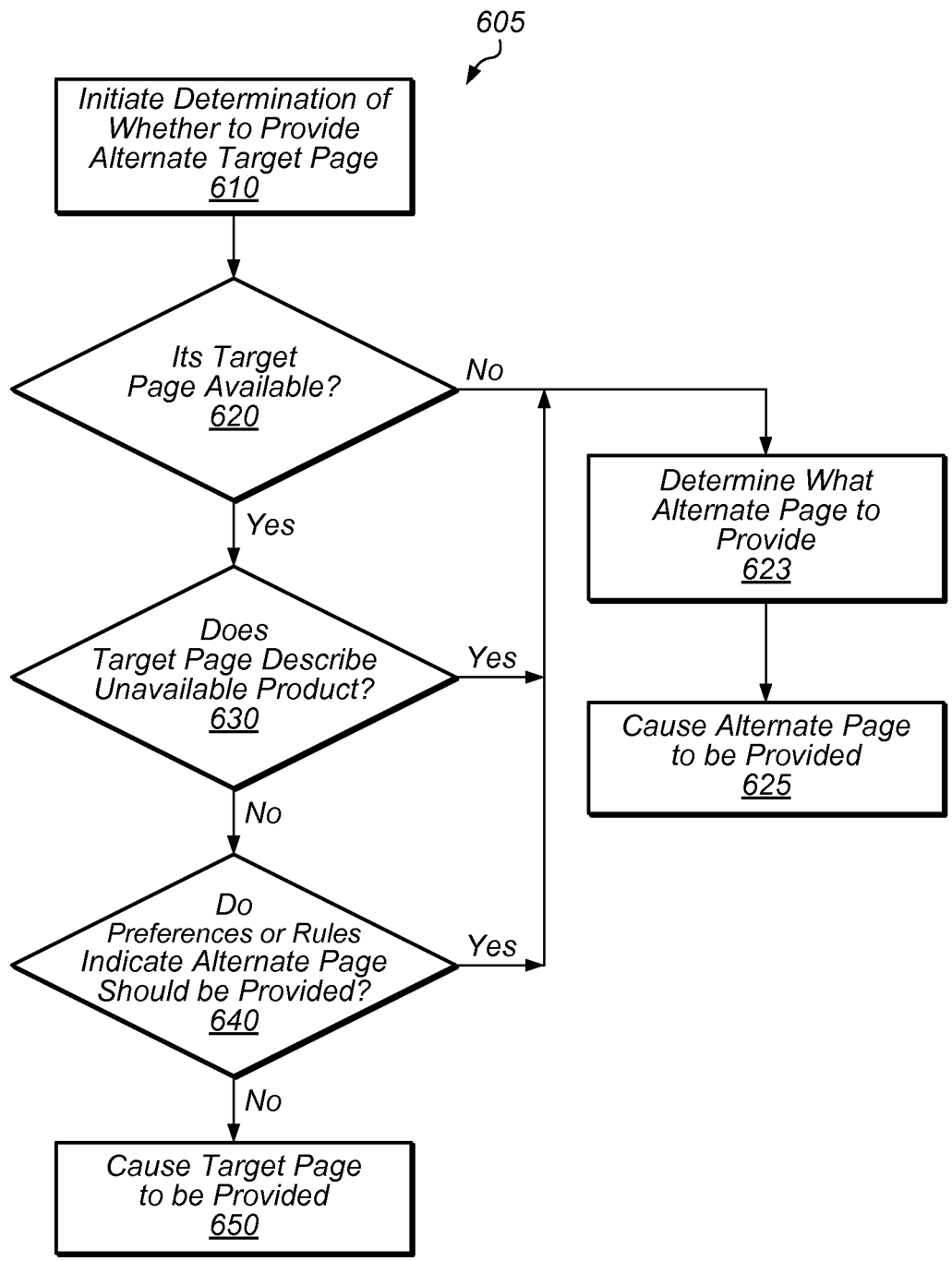
FIG. 6B is also a flowchart of an embodiment of a method used to determine whether an alternate page or an original target page should be provided.

Turning now to FIG. 6B, a flowchart 605 is shown of another embodiment of a method used to determine whether an alternate page or an original target page should be provided. In various embodiments of the method described below, one or more of the elements described may be performed concurrently, in a different order than shown, or may be omitted entirely. Other additional elements may also be performed as desired. All or a portion of steps of method 605 may be performed by a computer system as described below with respect to FIG. 9, which may be a redirection system in some embodiments. (Though another computing device or computer system may perform steps of method 605, they are described below relative to the RDS.)

In step 610, a determination of whether to provide an alternate target page is initiated. This determination is made, in one embodiment, in response to a request for a target web page originating from a user, and is based on a result of a fetch of data related to content of the target web page. In some embodiments, the fetched data includes an indication of whether the target web page is unavailable, and thus, in step 620, the RDS may determine a target page's availability. In one embodiment, the fetched data includes a result of a page request or page query for the target page. Thus, the RDS may contact a website or domain that is hosting the target page to determine if the target page is currently available. Such contact may take the form of an HTTP request in one embodiment. In some embodiments, the RDS may perform a page request prior to receiving information indicative of a request for a target page. For example, the RDS may preemptively poll a target page to check its availability, or the RDS may cache results of a previous poll and use the cached result rather than performing a new check.

In some embodiments, a given target page may be designated by the RDS as permanently unavailable. For example, a series of one or more availability checks for a given target page may indicate the target page was unavailable two months ago, one month ago, one week ago, and five hours ago. In such a situation, it would be reasonable to conclude that the target page is never likely to be available again, and saving that information. As another example, the RDS may be aware that a top level domain registration to which the target page belongs has permanently expired, which may result in all target pages for that domain being marked as permanently unavailable. This may be the case, for example, when a target page belongs to a "flash" shopping site, which by design may only be active for a period of hours or days. The RDS may be informed of the pre-determined expiration time and/or date for such a shopping site, and may act accordingly when determining availability for target pages belonging to a flash shopping site. In some cases, the RDS may determine that a target page is unavailable based on a creation date and/or time associated with a link to that target page. For example, a website may choose a policy in which products are only offered for three days, and are then removed from the site. In this case, if the RDS is aware that the site has such a policy, and that the link to the item was created (or first accessed by the RDS) over two weeks ago, the RDS may conclude that the target page corresponding to that link is unavailable without performing an actual request for that page. In one embodiment, the RDS is configured detect that a page is unavailable based on an automatic redirect encountered at the target page website server. For example, if the RDS attempts to request the URI "http://foo.com/fumanchu.html," and the foo.com server automatically redirects the RDS's request (e.g., to a top level page of "http://www.foo.com!" or to an error page of "http://www.foo.com/error.htm"), then the RDS may conclude that the originally requested target page of "fumanchu.html" was unavailable.

When a target page is believed to be permanently unavailable, the RDS may not perform an actual page request for the target page. In some embodiments, mechanisms may exist that will allow target pages to be removed from a list of pages believed to be permanently unavailable. For example, if a domain is expired, the RDS may perform an actual page request to confirm unavailability if it has been more than a given time period since a page request was last performed for that domain. Such a policy may also be implemented for individual target pages, in addition to and/or in place of a domain level policy in various embodiments. Accordingly, in various embodiments, the data related to content of the target page may include any of the page request data, historical or real-time, as described above, and the "fetch" of this data may include performing one or more HTTP page requests for target pages. (Fetching of this data may also comprise other steps or elements that result in the acquisition of data relating to content of the target web page, as further described below with respect to FIG. 7.)

In one embodiment, when the result of a fetch of data related to content of the target web page indicates that the target web page is not available, the RDS may cause an alternate web page to be provided (e.g., to a user making a request for the target web page). Accordingly when a target web page is unavailable, method 605 may proceed from step 620 to step 623 and/or step 625 in various embodiments.

In step 623, one or more alternate pages may be determined. In various embodiments, determining one or more alternate pages may be performed by the RDS, a user computing device, or some combination thereof. For example, in one embodiment, the RDS will determine a list of one or more alternate pages. In this embodiment, the RDS may then present the list of one or more alternate pages to a user computing device in response to the user's request for the target page. The user may then choose which of those alternate pages to navigate to (or even decline entirely the option of navigating to an alternate page). In other embodiments, such as "heavy client" embodiments (more on this below), the determining of one or more alternate pages may be performed by a user computing device or computer system. In one embodiment, step 623 is performed by a user or other computing device, and step 625 is performed by the redirection system. In other words, the RDS may cause an alternate page to be provided without actually determining the identity, location, and/or content of that alternate page. Step 623 may, in various embodiments, include any or all of the features of step 430 as described with respect to FIG. 4. Determining one or more alternate pages in step 623 may be performed based on actual content of the target web page in some embodiments, while in other embodiments, such determining may be performed based on other data (e.g., metadata) related to content of the target web page. More information on how alternate pages may be determined is described further below, following descriptions of steps 630, 640, and 650.

In the embodiment of FIG. 6, method 605 proceeds to step 625 after step 623. In various embodiments of step 625, causing an alternate page to be provided may be performed in any manner as described above with respect to step 440 of FIG. 4. Thus, for example, the RDS may cause one or more URIs for alternate pages to be sent to a user computing device or other computer system. In one embodiment, the RDS is configured to serve as a proxy or intermediary, and to seamlessly forward the actual content of the alternate web page to a user computing device. (As an aside, note that a variety of data and other information has been described above with respect to the process of steps 620, 623, and 625. This information, as well as any and all other data and information used in the process of other steps of method 605, may be recorded and maintained in a database as described further relative to FIG. 7).

In one embodiment of step 625, a message informing the user that a target product and/or target page is unavailable and the reason may be displayed in the user's browser in response to information from the RDS. A link to the original target page should the user wish to proceed anyway may also be displayed in some embodiments. Further, a list of alternative pages based on metadata about the target product (or other factors) may be displayed in some embodiments. Such a list may be shown in any form, but one implementation would be to display alternative product images with descriptions, that when clicked would take the user to that product page.

Turning back to step 620, the method proceeds to step 630 in the embodiment of FIG. 6 when it is determined that the target page is available. (Accordingly, even when the result of a fetch of data related to content of the target web page indicates that the target web page is available, a determination of whether to provide an alternate web page may still be made). Step 630 determines an alternate page should be provided, in the embodiment of FIG. 6, based on whether the target page describes an unavailable product. This determination may be based on actual content of the target web page. This content may be current (recently parsed) content in some embodiments, or may be historical content (earlier obtained) content in other embodiments. Thus, in some embodiments, step 630 may include performing a parse of the target web page to determine if at least one of a specified product is currently in stock. In one embodiment, this parse is performed "on demand" (e.g., in response to a user request), while in another embodiment, this part may be performed on a schedule basis according to one or more settings. In some embodiments, a combination of on demand and scheduled parsing can be used. Parsing a page could deliver additional information not related to one particular product; for example, a page parse could indicate all products for sale on a given page, including their sizes, colors, prices, etc. In another embodiment, metadata about products may be received at the redirection system via an automated feed mechanism (which could be either push or pull from a target web site). Product metadata may include data about product brand, cost, color, description and/or title, designer, size, style, website, listing age, and/or other information (and thus may be metadata related to content of the target web page). Metadata about a user may also be maintained by the RDS in some embodiments, and may include a user's physical characteristics, size preferences, economic preferences, brand, style, or material preferences, etc. Essentially, a user may have preference or characteristic data related to any aspect of product data or website data in various embodiments.

Note that in various embodiments, historical data may be used in any of the steps of FIG. 6. For example, a product may be referred to as "specified as being for sale by a target web page" or as being "associated with a target web page." In some embodiments, at the time that a step is performed, a product may no longer be specified as being for sale on the target web page even though it was for sale in the past. Accordingly, a product may be said to be "currently or previously" having a certain relationship to a target web page to indicate that it had that relationship (e.g., being for sale) either in the past or in the present. Data that is content of a target web page or that relates to content of a target web page may also thus be data that is indicative of a current (present) state of the target web page and/or data that is indicative of a previous version of the target web page.

Metadata related to content of a target web page may also include heuristic data. In some embodiments, a redirection system may use information about past transactions and the success of other redirects to determine if a target page related to a particular product should be served. Heuristic data might include such information as: frequency or percentage of past purchases in general by the user making the target page request, price amounts of previous purchases and previous non-purchases, frequency or percentage of all visiting users in buying a particular product from the target web page, etc. More generally, heuristic data may include any aggregation of product metadata, user-related metadata, and website-related metadata in various embodiments.

Heuristic data and/or user data may be used in some embodiments to determine that a target page should be provided even when the target page does not indicate that a particular requested product is available. For example, a user may click on a link that indicates a request for a target page offering for sale men's blue jeans with a size 33 waist and a size 30 inseam. The RDS may determine that no blue jeans in this size are available on the target page, but that men's blue jeans in a size 34 waist and 30 inseam are, in fact, available for sale at the target page. Based on specified, aggregated, or user-specific data, the RDS may determine that despite the fact that the exact requested product is not available on the target page, the substitute product is likely to be similar enough that no alternate page should be used. (The user may be optionally warned that an exact match was not found, in some embodiments, before proceeding to such a target page, and may even be given a choice not to proceed or to attempt to find a different match elsewhere). Accordingly, in various embodiments, a target web page may specify a product, and metadata related to content of the target web page may include information related to one or more physical characteristics of the product.

In step 630, request context data may be used to determine whether a target page describes an unavailable product. Request context data may include a time and/or date of the request, or geographic data such as country (which may be discerned from IP address data in some embodiments). The redirection system may be aware, for example, that a target web page is on a website that only accepts orders from Canada and the U.S.A. Accordingly, if the RDS detects that a user from the United Kingdom is attempting to reach a target page on that website, step 630 may determine that a product is unavailable.

In step 640, a redirection system may determine whether any preferences indicate that an alternative target page should be provided. These preferences may be user preferences, administrative or other preferences set by the redirection system, or preferences of other parties (such as the preferences of a website having one or more target pages). In some embodiments, a user may set a variety of preferences related to redirection and/or product purchase. For example, a user may indicate a preference not to buy items costing more than a threshold amount (e.g., $100). When the redirection system detects that a product on a target web page costs more than the threshold, the redirection system may determine that a user should be presented with one or more alternative pages having similar items that cost less than the threshold. A user may likewise have brand preferences, material preferences, designer preferences, or any other type of preference related to products. Based on such preferences, the redirection system may determine that one or more alternate pages having alternate products should be provided. Accordingly, in one embodiment, determining whether to provide an alternate web page may be based on data related to a user making the request for the target web page. This data may in some embodiments be preference data specified by a user (such as preferred sizes, materials, brands, etc), or may be other data provided by a party other than the user.

A user may also have site-related preferences in some embodiments. For example, a user may have loyalty to a particular retailer, or receive rewards or special privileges (such as free or discounted shipping) from that retailer. Thus, a user may specify that when an identical product to one on a requested target page is available from a particular retailer, the RDS should provide the user with an alternate page on that retailer's website. Or, the user may specify a broader preference in one embodiment, and indicate that whenever a similar product is available on that retailer's website that costs within no greater than 2.5% of an original target item's cost, the user wishes to receive an alternate page for the similar product.

Administrative preferences and/or other third party preferences may be set, received, or maintained by the redirection system in various embodiments. For example, a rule might be established that if two or more retailers have a same or similar price for a particular product on a target page, the user should be presented with an alternate page if it will result in a greater affiliate referral fee from the retailer to the owner of the RDS. Other administrative preferences by the RDS may also be implemented.

Further, note that in some embodiments, various "context" data may be used to determine whether to provide an alternate page and/or what that alternate page should be. For example, if a request is made more than one year after a target page was last updated, an RDS may always choose to provide an alternate page. Context data may also include user location (e.g., IP address) or other information. In one embodiment, a determination of whether to provide an alternate page is based on context data related to a request of the target web page (for example, as noted above, the RDS may simply assume that the target web page should not be provided if a certain period of time has passed since it was last updated or created).

Lastly, retailer and/or target website preferences may be used in step 640 in various embodiments. For example, a retailer may indicate a preference to the RDS not to do business in certain countries, or not to do business in certain countries for certain dollar amounts or for certain types of items. A seller of online electronics in the United States, for example, may indicate to the RDS that it does not wish to sell certain products to anyone living in Iran or the Sudan due to export controls. Thus, retailer preferences may indicate that an alternate page should be provided in various embodiments. Information describing the preferences described above-user preferences, administrative (RDS) preferences, and target website preferences—may be communicated to the RDS in various embodiments and stored on a computer-readable storage medium such as storage device 725. In accordance with the above, in various embodiments, determining whether to provide an alternate web page may be based on preference data specified by a party other than a user making the request for a target web page.

In step 650, the redirection system causes the target page to be provided to a user computer device or other computer system. In one embodiment, step 650 includes providing a URI for the target page to a user computing device or other computer system. The target page URI may be determined by the RDS, for example, by dereferencing an identifier located in a redirection URI that is received by the RDS (e.g., a URI in the form of 380, 382, 384, 386, etc.). Step 650 may also include, in some embodiments, elements of step 625. That is, in some instances, both a target page and an alternate page may be provided. For example, the RDS may present the user with the target page if it is available, but also present an alternate page if it features a same or similar product for sale, or for any of the other reasons explained herein that an alternate page might be presented. In some embodiments, both a target page and an alternate page can be provided to a user, along with an automatic redirect that will cause the user's browser to navigate to the alternate page unless the user takes intervening action without a certain time period (e.g., less than 3 seconds). (Automatic redirects may also be used when the target page is unavailable or is otherwise not provided to a user.) An automatic redirect might be used, for example, in response to user preferences to always favor one retailer's web site over another (as long as items and/or pricing were similar enough). In other embodiments, presenting two or more pages to a user (either a target and one or more alternates, or simply two or more alternates) may cause the user's browser to display a page in which the user is not automatically redirected, and must instead select one of the choices to continue.

In accordance with the above, a method has been described in which various factors may be considered in determining whether an alternate page should be provided. However, additional information on what alternate page should be provided (e.g., how to determine the identity, location, and/or content of an alternate page) in various embodiments of this method is further described below. Accordingly, as used herein the term "determine an alternate page" means to determine information indicative of a location and content of the alternate page. Thus, "determine an alternate page" does not include a simple "static" redirection in which a site may be configured to send all users to a generic error page upon reaching a "page not found error." (In other words, the phrase "determine an alternate page" may indicate that a decision has to be made between two or more possible alternate pages, rather than a pre-programmed, static redirection to a single destination that cannot be changed. The phrase "provide an alternate page" may be used to indicate, in various embodiments, that the location and/or the content of an alternate page is being provided.

Accordingly, returning to step 623, a redirection system may receive an indication that an alternate page should be provided, and then determine that page. The determination may be based on any number of data and factors as discussed above with respect to steps 630 and 640. For example, a determination may be made as to whether an alternate page has an identical product, a similar product has a product for the same price, lower price, or within a certain price range, etc. Determining whether a product is similar enough to be considered "similar" may involve using various metrics in different embodiments, and may include comparisons of information such as brand, material, style, warranty, etc.

In one embodiment, recommendation engine is used to provide suggestions of what alternate page should be provided. Such a recommendation engine may receive inputs concerning information about a product, and then provide and output of one or more similar or recommended products. A recommendation engine may be implemented in the redirection system itself, or from any suitable external source (such as Google search or an external API), or a combination of any of the foregoing.

Determining what alternate page to provide includes, in one embodiment, the redirection system dynamically generating a custom page rather than using a pre-existing page. For example, the redirection system might parse together HTML showing a variety of links to different pages with various products, and provide this HTML page to a user. Such a dynamically generated page may include or make use of any information available to a redirection system. In one embodiment, dynamically generating a custom page may thus include the redirection system retrieving some or all of the content of one or more alternative pages, and then packaging that information into a single page to be delivered to a user by the redirection system. A link on a dynamically generated page can point, in some embodiments, to another website hosting the alternate page on which a product referred to by that link is available for sale.

Figure 7:
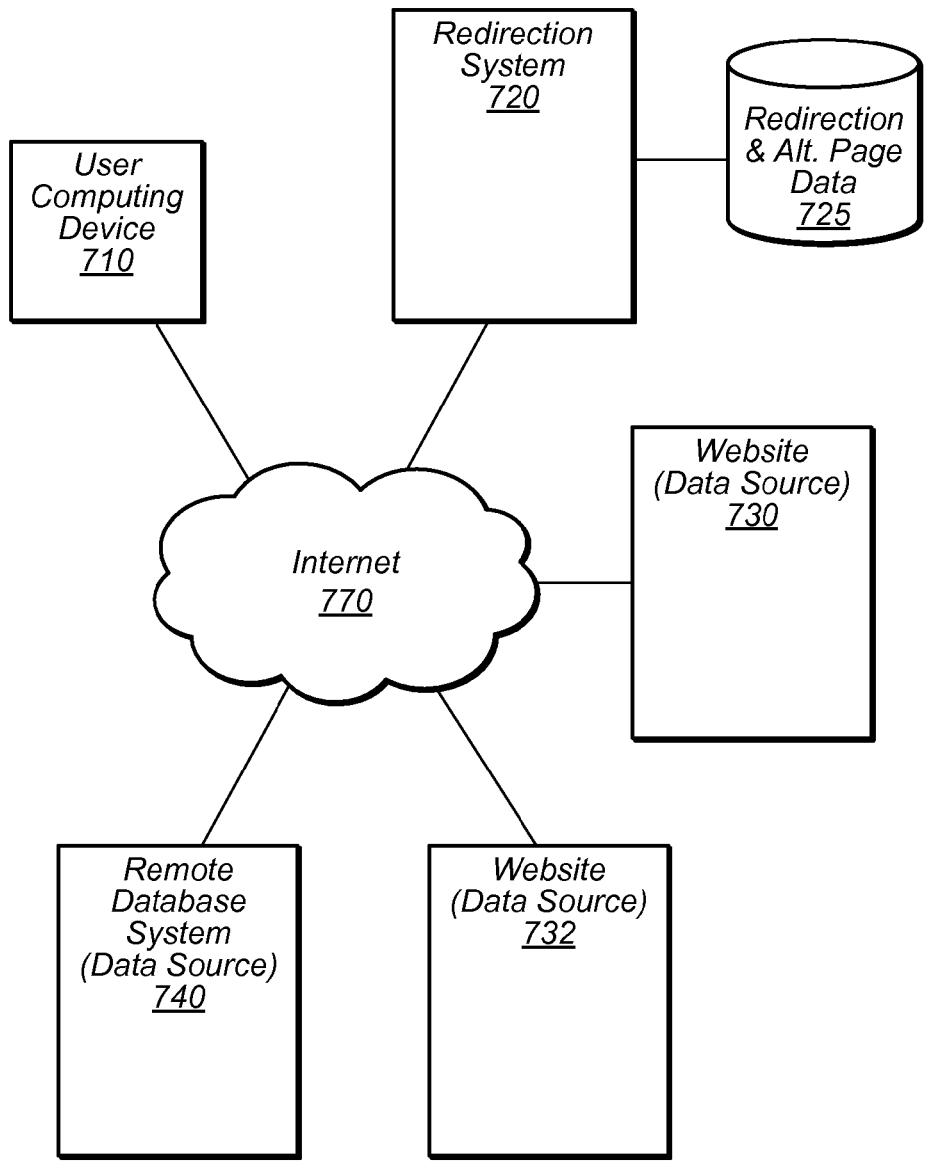
FIG. 7 is a block diagram of one embodiment of a system, in which a user computing device, redirection system, and data sources are connected via a network.

Turning now to FIG. 7, a block diagram of one embodiment of a system is shown. In this embodiment, several computer systems and devices (user computing device 710, redirection system 720, website 730, website 732, and remote database system 740) are shown as being connected via a network 770, which may be the Internet in various embodiments.

A great deal of information has been described above, such as data related to content of a target page, product data, preference data, and/or various other data. Any or all of this data may be stored and maintained by redirection system 720 in the embodiment of FIG. 7. Redirection system 720 is coupled to a storage device 725 that is configured to store data relating to redirection and alternate page determination. Thus, device 725 may store a mapping between shorthand identifiers for target URIs and the full length target URIs themselves. Device 725 may store rules, policies, preferences and other information, and may be configured to be accessible to one or more user interfaces to allow editing of the data. In some embodiments, redirection system 720 is configured to implement one or more web services that may receive queries as to whether an alternate page should be provided, and reply with the identity and/or content of such a n alternate page.

Data stored in device 725 may be derived from a variety of sources, including but not limited to user computing device 710, websites 730 and 732, and/or remote database system 740. Accordingly, in one embodiment, the redirection system may receive inventory or other data from a source other than a target web page, and determining whether to provide an alternate web page in response to the request may be based on such inventory (or other) data related to a product associated with the target web page. Accordingly, in one embodiment, the source other than the target web page is a inventory feed that is either provided to a redirection system by a website or third party. The inventory feed may be provide periodically (e.g., daily, weekly, etc). in some embodiments. In other embodiments inventory and other data may be received directly from parse of a target web page.

Device 725 may therefore act as a data "sink" for a variety of data sources in different embodiments. Historical data for purchases, attempted purchases, target and alternate page content and availability, target website data, other financial data related to any aspect of a purchase and/or attempted purchase, and any other data that may be used to determine whether an alternative page (or what alternative page) should be provided may be retained in one or more embodiments. As such, device 725 may be useful in formulating or evaluating various heuristic formulas that determine whether or not an alternate page should be provided, and what that alternate page should be. Data may be cached by redirection system 720 and/or device 725 in some embodiments, and certain data or certain types of data may be flushed or discarded after specified time limits have expired.

In some embodiments, less recent data may be accorded a lesser weight in decision making processes. For example, if a redirection system is determining whether a first alternate page or a second alternate page should be provided, preference may be given to whichever alternate page is most recently indicated as having a target item available. For example, if the redirection system has a record that the first page was selling the target item as of one week ago, and also has a record indicating the second page was selling the target item as of yesterday, the second page may be given preference and thus provided to a user. Note that in general, various formulas and metrics in accordance with this disclosure may be used to rate or rank different alternate pages, and can depend on any of the data available to a redirection system. (Thus, in one embodiment, a list of one or more alternate pages may be presented to a user based on one or more ranking or preference schemes.)

Figure 8:
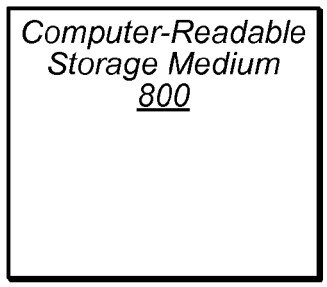
FIG. 8 is a block diagram illustrating a computer-readable storage medium on which one or more code modules may be stored.

Turning now to FIG. 8, a block diagram is shown illustrating computer-readable storage medium 800 is shown. In various embodiments, any or all of the functionality described above with respect to link capture, link processing, redirection, alternate page determination, and/or one or more of the steps of methods 400, 500, 550, 600, 605, or portions thereof may be implemented and stored as one or more modules on medium 800. Instructions executable to run a web service implementing any module and/or any of the above-described functionality are included on medium 800 in some embodiments. Medium 800 can be present in any computer system or computing device described herein (e.g., a user computing device, a web server, redirection system, etc). In some embodiments, various combinations of one or more modules may be combined on a same computer-readable medium, while in other embodiments, different computer-storage readable mediums may store modules or functions thereof.

In one embodiment, a "heavy client" system may exist in which a client computing device includes all or a great portion of the various modules that may be stored on medium 800. Thus, in some embodiments, a client computing device or computer system may be configured to perform link processing and/or interception, determination of whether an alternate page should be provided, determination of what that alternate page should be, and cause that alternate page to be provided (i.e., perform all of steps 405-440); thus, a redirection system such as 720 may not be needed in some embodiments. In other "heavy client" embodiments, a client may perform some of these tasks only with assistance from the redirection system. For example, a client system may determine that an alternate page should be provided in response to a target page request (e.g., when the target page is unavailable), but the client system may then communicate with the redirection system to determine what alternate page(s) should be provided.

It is noted that the above-described embodiments may comprise software. In such an embodiment, program instructions that represent the described systems and/or methods may be stored on a computer readable storage medium (e.g., 800). Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link. As used herein, the term computer readable storage medium refers to a non-transitory (tangible) medium, and does not include transitory (intangible) media (e.g., a carrier wave).

Exemplary Computer System

Figure 9:
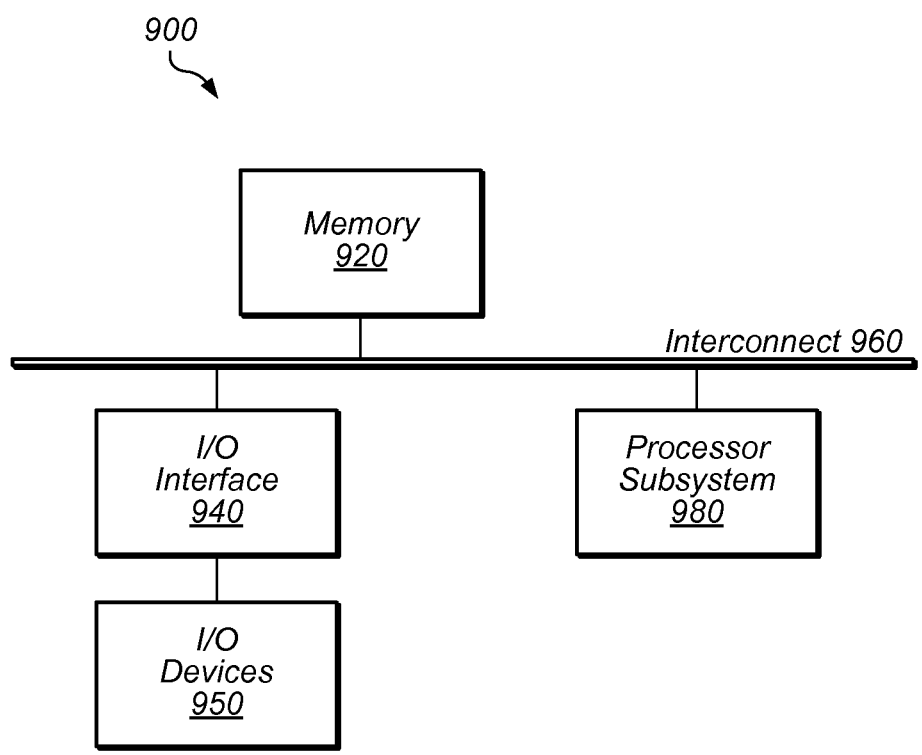
FIG. 9 is a block diagram illustrating one embodiment of a computer system.

Turning now to FIG. 9, one embodiment of an exemplary computer system 900 is depicted. All or a portion of computer system 900 may be used to implement any or all portions of the systems and devices depicted in FIG. 7.

Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 900 may also be any type of networked peripheral device such as storage devices, switches, modems, routers, etc. Although a single computer system 900 is shown for convenience, system 900 may also be implemented as two or more computer systems operating together.

Processor subsystem 980 may include one or more processors or processing units. For example, processor subsystem 980 may include one or more processing units (each of which may have multiple processing elements or cores) that are coupled to one or more resource control processing elements. In various embodiments of computer system 900, multiple instances of processor subsystem 980 may be coupled to interconnect 960. In various embodiments, processor subsystem 980 (or each processor unit or processing element within 980) may contain a cache or other form of on-board memory. Note that us used herein, the term "processor" has its ordinary and accepted meaning in the art, and includes a device that is capable of executing instructions. A processor may refer, without limitation, to a central processing unit (CPU), a co-processor, an arithmetic processing unit, a graphics processing unit, a digital signal processor (DSP), etc. A processor may be a superscalar processor with a single or multiple pipelines. A processor may include a single or multiple cores that are each configured to execute instructions.

System memory 920 is usable by processor subsystem 980, and comprises one or more memory elements in various embodiments. System memory 920 may be implemented using different physical memory media, such as hard disk storage, floppy disk storage, removable disk storage, flash memory, random access memory (RAM-static RAM (SRAM), extended data out (EDO) RAM, synchronous dynamic RAM (SDRAM), double data rate (DDR) SDRAM, RAMBUS RAM, etc.), read only memory (ROM-programmable ROM (PROM), electrically erasable programmable ROM (EEPROM), etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device. As noted above, program instructions that are executable by computer systems (e.g., computer system 900) may be stored on various forms of computer readable storage media.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
 a computer system receiving information indicative of a request for a target web page associated with a first item for sale, wherein the target web page is within a target website;
 receiving a result of a fetch of data related to content of the target web page, wherein the result indicates that the target web page is available; and
 the computer system determining whether to provide, in response to the request, an alternate web page that is different than the target web page and is associated with a second item for sale that is a replacement for the first item, wherein the second item is available for purchase via the alternate web page, wherein the determining is based on the result of the fetch of data related to the content of the target web page, and wherein the result indicates that the target web page is unavailable;
 wherein the determining is performed external to the target website, and wherein the second item is different from the first item in at least one characteristic including at least one of color, size, price, brand, designer, or material of construction.

2. The method of claim 1, further comprising:
 the computer system determining the alternate web page to be provided in response to the request; and
 the computer system causing the alternate web page to be provided;
 wherein the alternate web page is within a different website than the target website.

3. The method of claim 1, wherein the determining whether to provide an alternate web page is based on the content of the target web page.

4. The method of claim 1, further comprising:
 determining the alternate web page based on the data related to content of the target web page, wherein the data related to the content of the target web page indicate that the first item is not currently in stock by a seller associated with the target website; and
 causing the alternate web page to be provided in response to the request.

5. The method of claim 1, wherein the fetch of data related to content of the target web page occurs prior to the request of the target web page.

6. A non-transitory computer-readable storage medium having instructions stored thereon that, if executed, cause a first computer system to perform operations comprising:
 receiving information indicative of a request for a target web page located on a target website implemented by a set of one or more computer systems that do not include the first computer system, wherein the target web page is associated with a first item for sale;
 receiving a result of a fetch of data related to content of the target web page; and
 determining to provide, in response to the request, alternate content to the content of the target web page associated with the first item for sale, wherein the alternate content is associated with a second item for sale that is a replacement for the first item, wherein the second item is available for purchase via the alternate content to the content of the target web page, wherein the determining is based on the result of the fetch of data related to the content of the target web page, and wherein the result indicates that the target web page is unavailable;
 wherein the determining is performed external to the target website, and wherein the determining is based on the second item differing from the first item in at least one characteristic, including color, size, price, brand, designer, or material of construction.

7. The non-transitory computer-readable storage medium of claim 6, wherein the result of the fetch of data indicates that the first item is not available for purchase.

8. The non-transitory computer-readable storage medium of claim 7, wherein the result indicating that the first item is not available for purchase includes an age of a web link for the target web page, wherein the web link corresponds to the request for the target web page.

9. The non-transitory computer-readable storage medium of claim 7, wherein the operations further comprise determining to provide the alternate content based on the result of the fetch of data indicating that a characteristic of the item has changed.

10. The non-transitory computer-readable storage medium of claim 6, wherein the operations further comprise:
 determining the alternate content based on location context data related to the request; and
 causing the alternate content to be provided in response to the request.

11. The non-transitory computer-readable storage medium of claim 6, wherein the operations further comprise:
 determining the alternate content based on preference data specified by a user making the request for the target web page; and
 causing the alternate content to be provided in response to the request.

12. The non-transitory computer-readable storage medium of claim 6, wherein the operations further comprise:
 determining specifics of the alternate content based on the data related to the content of the target web page; and
 causing the alternate content to be provided in response to the request.

* * * * *